United States Patent
Waters

[11] Patent Number: 6,158,477
[45] Date of Patent: Dec. 12, 2000

[54] FLEXIBLE DUCT AND METHOD OF MAKING SAME

[75] Inventor: Michael J. Waters, Greenwood, S.C.

[73] Assignee: Flexible Technologies, Inc., Abbeville, S.C.

[21] Appl. No.: 09/215,816

[22] Filed: Dec. 18, 1998

[51] Int. Cl.$^7$ .................................................. F16L 11/08
[52] U.S. Cl. .......................... 138/129; 138/125; 138/132; 138/144; 138/173
[58] Field of Search .................................. 138/129, 122, 138/125, 121, 132, 173, 174, 137, 141, 144

[56] References Cited

U.S. PATENT DOCUMENTS

| | | | |
|---|---|---|---|
| 3,216,458 | 11/1965 | Sabe | 138/134 X |
| 3,479,670 | 11/1969 | Medell | 138/129 X |
| 3,674,056 | 7/1972 | D'Aprile | 138/134 |
| 4,098,298 | 7/1978 | Vohrer | 138/122 |
| 4,196,755 | 4/1980 | Kutnyak et al. | 138/150 |
| 4,599,784 | 7/1986 | Canu, Jr. et al. | 138/122 X |
| 5,526,849 | 6/1996 | Gray | 138/134 X |

FOREIGN PATENT DOCUMENTS 1211891  12/1958  France ..................... 138/121

*Primary Examiner*—Patrick Brinson
*Attorney, Agent, or Firm*—Francis N. Carten

[57] ABSTRACT

A flexible duct and method for making the duct are disclosed. The duct includes an inner wall bonded to an outer wall, with a wire resilient helix and a scrim sandwiched therebetween. The scrim is in the form of a helical tape embedded between the outer wall and the inner wall, and preferably consists of a bonded yarn constructed in a layered or interwoven square or other uninterrupted geometrical pattern. The presence of the scrim provides the duct with high tensile strength and excellent tear resistance in all directions, especially in the helical direction. The method of manufacturing the duct includes the steps of helically forming the wire and scrim about the inner wall and bonding the outer wall to the inner wall to as to sandwich the helix and the scrim between the inner and outer walls.

8 Claims, 3 Drawing Sheets

FLEXIBLE DUCT AND METHOD OF MAKING SAME

BACKGROUND OF THE INVENTION

Flexible ducts are designed for a wide variety of uses, e.g., to transport fluids such as heated, cooled or exhaust air, or air mixed with other gasses or particulate matter, or both. Specifically, flexible ducts may be employed in residential or office buildings as components of heating, ventilating and air conditioning systems, or in industrial plants to carry away dust and fumes. In such applications, and in the process of being installed therein, flexible ducts are subjected to a variety of forces that may cause damages of such kind and extent as to render the ducts unsuitable for safe and effective use. Thus, it is essential to have flexible duct with sufficient strength to resist these forces. The present applicant has addressed this need, and has designed a flexible duct that exhibits exceptional strength.

SUMMARY OF THE INVENTION

The present invention relates to flexible ducts for conducting fluids, and more particularly to a flexible duct that incorporates a resilient helix and a strengthening scrim between an inner wall and an outer wall. The resilient helix provides the rigidity needed to form the generally tubular construction of the duct, while permitting the duct to flex about several axis points. The strengthening scrim is in the form of a helical tape embedded between the outer wall and the inner wall of the duct, and preferably consists of a bonded yarn constructed in a layered or interwoven square or other uninterrupted geometrical pattern. The strengthening scrim is helically disposed between the inner and outer walls, which are bonded to each other so as to retain both the resilient helix and the scrim between the walls.

A method for forming the flexible duct is also disclosed. The method comprises helically feeding a tape on a continually-advancing mandrel to form the inner wall, similarly forming the resilient helix and the scrim about the inner wall, and similarly forming the outer wall, which is bonded to the inner wall to secure the resilient helix and the scrim between the inner and outer walls.

DESCRIPTION OF THE DRAWINGS

The written description of the present invention will be more fully understood when read with reference to the accompanying drawings, of which.

DETAILED DESCRIPTION OF THE PREFERRED EMBODIMENT

Figure 1:
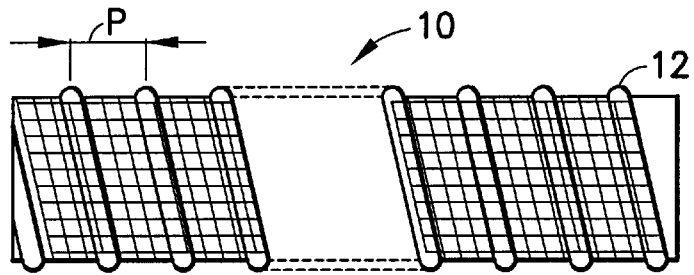
FIG. 1 is a side view of the flexible duct embodying the present invention.
Figure 2:
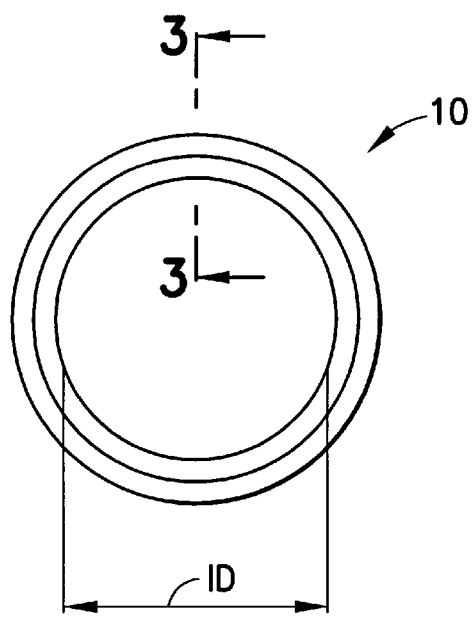
FIG. 2 is an end view of the flexible duct embodying the present invention.
Figure 3:
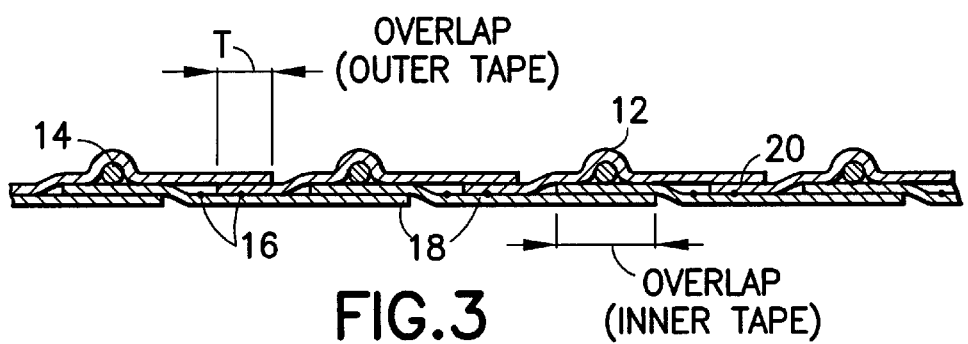
FIG. 3 is a cross-sectional view of the flexible duct embodying the present invention, taken along lines 3—3 in FIG. 2.

Referring now specifically to FIGS. 1, 2 and 3, the duct 10 comprises an outer wall 12, a resilient helical member 14, a strengthening scrim 16, and an inner wall 18. The outer wall 12 and the inner wall 18 are formed from tapes made of thermoplastic material such as polyester or the like, with adhesive 20 being applied to the surfaces of both tapes. Optionally, the adhesive 20 may be applied to the surface of only one tape, or the bonding of the facing surfaces of the outer wall 12 and the inner wall 18 can be effected by thermal fusion. The thickness of these tapes is increased with increasing duct diameter.

The resilient helical member 14 is preferably formed of metal wire, which provides the structural rigidity to resist radial compression and expansion forces exerted upon the duct 10 while allowing the duct 10 to be flexible around several axis points. The resilient helical member 14 also enables elasticity in the duct 10 so as to permit expansion and contraction between its consecutive turns without stress failures. The diameter of the resilient helical member 14 is increased with increasing duct diameter.

Figure 5:
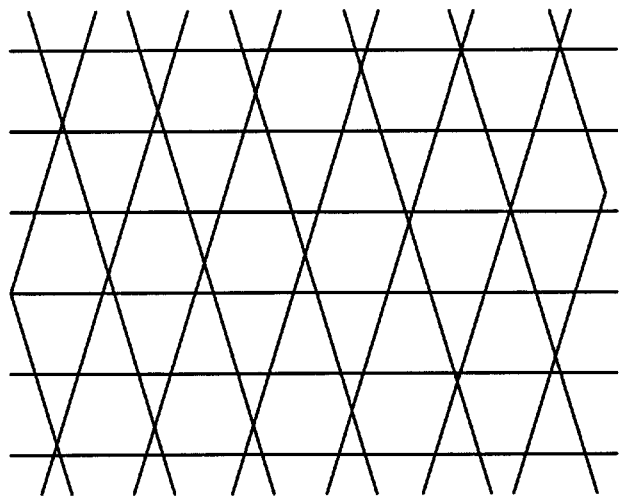
FIGS. 5, 6 and 7 show several forms of scrim that may be components of the flexible duct shown in FIGS. 1, 2 and 3.
Figure 6:
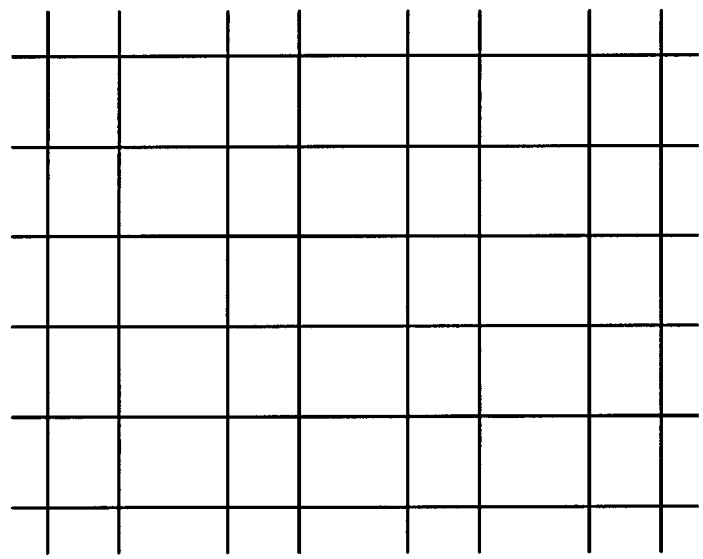
Figure 7:
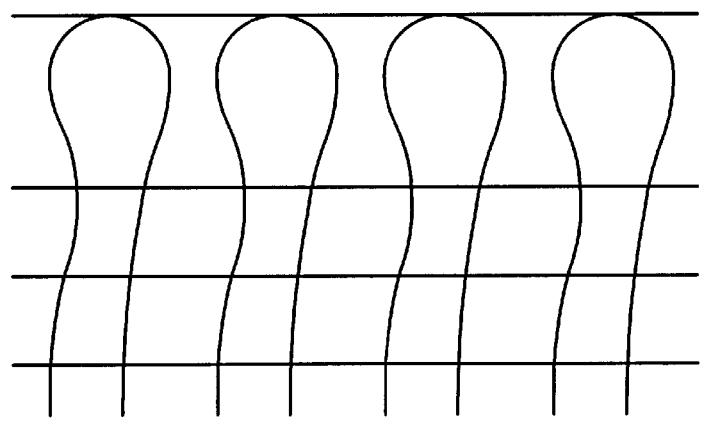

The scrim 16 is in the form of a helical tape embedded between the outer wall 12 and the inner wall 18 in the duct 10, and preferably consists of a bonded yarn constructed in a non-interwoven (layered) or interwoven square or other uninterrupted geometrical pattern. The presence of the scrim 16 provides the duct 10 with high tensile strength and excellent tear resistance in all directions, especially in the helical direction. FIGS. 5, 6 and 7 show several configurations for the scrim 16 in full scale. In FIG. 5, the scrim consists of three tridirectional interwoven fiberglass yarns forming a diamond pattern overlaid with horizontal yarns. In FIG. 6, the scrim consists of two bidirectional interwoven fiberglass yarns forming a rectangular pattern. In FIG. 7, the scrim consists of two bidirectional interwoven fiberglass yarns forming a rectangular pattern and cut from the edge of a master roll, sometimes referred to as selvedge.

Figure 4:
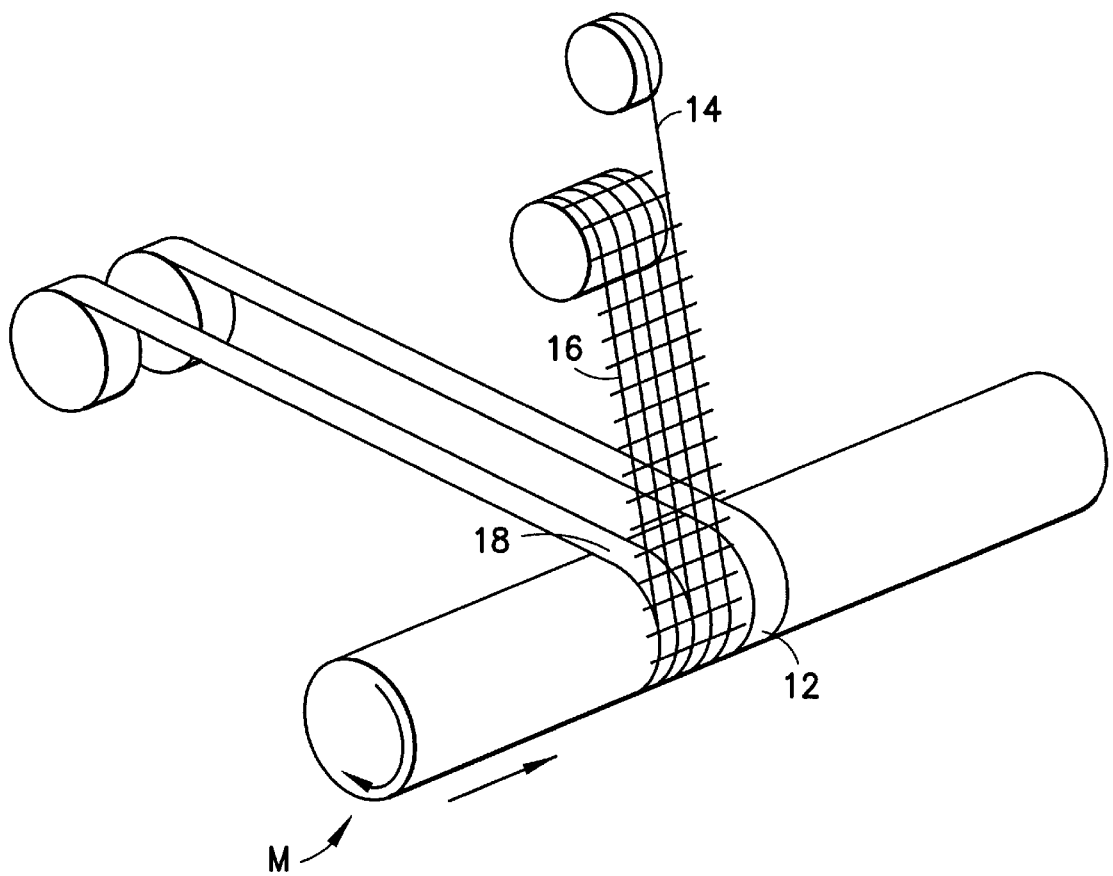
FIG. 4 is a perspective view of the apparatus for carrying out the method of manufacture of the flexible duct shown in FIGS. 1, 2 and 3.

Referring now to FIG. 4, the method of making the duct 10 is illustrated. In this method, there is employed a continually-advancing, rotating mandrel M of the type used for single-lead products. The tape used to form the inner wall 18 is fed onto the mandrel at a predetermined angle so as to partially overlap itself. This angle determines the pitch P, which is the distance between successive coils of the resilient helical member 14, which in turn requires a certain tape width. The pitch P varies in direct proportion to the diameter of the duct. By way of specific example, a duct with an inner diameter ID of 6.20 inches would preferably have a pitch P of 1.875 inches and utilize tapes of 2.375 inches width with 0.475 inch overlap, and a resilient helical member 14 with a diameter of 0.050 inches, providing a duct with wall thickness T of approximately 0.0024 inches.

The strengthening scrim 16 is simultaneously fed onto the mandrel at the aforesaid predetermined angle. The width of the strengthening scrim 16 is such that it will partially overlap itself. The scrim 16 is in the form of a helical tape, and preferably consists of a bonded yarn constructed in a layered or interwoven square or other uninterrupted geometrical pattern.

The resilient helical member 14 is also simultaneously fed onto the mandrel at the aforesaid predetermined angle so as to underlie overlapping portions of the tapes forming the outer wall 12 and the inner wall 18. Preferably, the resilient helical member 14 is formed of metal wire of suitable diameter. However, other materials having shape memory (such as plastics) may be used in undemanding environments.

The tape used to form the outer wall 12 is also simultaneously fed onto the mandrel at the aforesaid predetermined angle so as to partially overlap itself and to be offset (in the direction of travel on the mandrel) from the tape used to form the inner wall 18. The resilient helical member 14 is positioned approximately at the mid-width point of the tape used to form the outer wall 12 and approximately at the center of the overlapping portion of the tape used to form the inner wall 18 to insure the retention of the resilient helical member 14 between the two walls 12, 18. As previously described, adhesive can be applied by conventional means (not shown) to one or both opposing faces of the tapes forming the two walls 12, 18. Alternatively, the means for applying adhesive can be replaced by known means for effecting thermal fusion of the opposing faces of the tapes forming the two walls 12, 18.

Certain modifications and variations of the disclosed embodiment of the present invention will be apparent to those skilled in the art. For example, the disclosed duct may be (i) an uninsulated final product with a clear inner wall and an opaque outer wall, or (ii) insulation and an opaque outer cover may be added to produce an insulated product, with both the inner and outer walls being clear. It should be understood that the disclosed embodiment is intended to be illustrative only, and not in any way restrictive of the scope of the invention as defined by the claims set forth hereunder.

I claim:

1. A flexible duct comprising:
   (a) an inner wall formed of helically-overlapping tape of a predetermined width;
   (b) an outer wall formed of helically-overlapping tape of a predetermined width overlying said inner wall and having a bond formed therewith;
   (c) a resilient helical member disposed and retained between said inner and outer walls; and
   (d) a strengthening scrim formed of helically-disposed tape comprising a plurality of bonded multiple yarn having a layered, geometrical uninterrupted pattern disposed and retained between said inner and outer walls.

2. A flexible duct according to claim 1, wherein said plurality of bonded multiple yarns has an interwoven, geometrical uninterrupted pattern.

3. A flexible duct according to claim 1 or 2, wherein said geometrical uninterrupted pattern is formed of two yarns and is rectangular.

4. A flexible duct according to claim 1 or 2, wherein said geometrical uninterrupted pattern formed of three yarns, two of said yarns forming a diamond pattern and the third of said yarns being disposed horizontally on said diamond pattern.

5. A flexible duct according to claim 1, wherein said resilient helical member is positioned approximately at the mid-width point of the tape used to form the outer wall and approximately at the overlapping portions of the tape used to form the inner wall.

6. A flexible duct according to claim 1, wherein said bond is formed between said inner wall and said outer wall by adhesive applied to at least one of said tapes forming said inner wall and said outer wall.

7. A flexible duct according to claim 1, wherein said bond is formed between said inner wall and said outer wall by adhesive applied to both of said tapes forming said inner wall and said outer wall.

8. A flexible duct according to claim 1, wherein said bond is formed between said inner wall and said outer wall by thermal fusion.

\* \* \* \* \*